June 5, 1962 D. W. SCOFIELD 3,037,358

REFRIGERATION APPARATUS

Filed Jan. 25, 1961 2 Sheets-Sheet 1

INVENTOR.
DONALD W. SCOFIELD
BY
Harry W. Hargis III
AGENT

INVENTOR.
DONALD W. SCOFIELD
BY
Harry W. Hargis III
AGENT

United States Patent Office 3,037,358
Patented June 5, 1962

3,037,358
REFRIGERATION APPARATUS

Donald W. Scofield, Glenside, Pa., assignor, by mesne assignments, to Philco Corporation, Philadelphia, Pa., a corporation of Delaware Filed Jan. 25, 1961, Ser. No. 84,850
17 Claims. (Cl. 62—3)

This invention relates to refrigeration apparatus, and more particularly to improvements in apparatus of the type disclosed and claimed in the co-pending application of Lloyd A. Staebler, Serial No. 84,915, filed January 25, 1961, and assigned to the assignee of the present invention.

Briefly described, the Staebler application discloses and claims generically, in a refrigerating machine, a first refrigerating system of the liquid-vapor type, and including a heat absorbing element for performing a first higher temperature refrigerating function; and a second, auxiliary refrigerating system of the thermoelectric type, and including cold junctions for performing a second lower temperature refrigerating function, and hot junctions arranged to be cooled by said heat absorbing element. An arrangement of this type has been found to be advantageous, since bringing into novel heat exchange relation portions of the refrigerating systems operating on dissimilar principles makes it possible to maintain, in a single machine, temperatures lying within a wide range.

The present invention is directed in particular to improved means for effecting the above described novel heat exchange relation between portions of dissimilar refrigerating systems.

It is therefore a broad objective of the present invention to provide dissimilar refrigerating systems in such improved cooperative heat exchange relation with respect to one another as to permit each to operate at high efficiency.

In the achievement of the foregoing and other objectives, the invention contemplates embedding hot junctions of thermocouple means in a material of high thermal conductivity arranged in direct heat exchange relation with the cooling element of a room air conditioner, the cold junctions being disposed and adapted to perform an auxiliary cooling function. In one embodiment thereof, the invention contemplates embedding by immersion of the hot junctions and the air conditioner cooling element in a heat exchange liquid. In another embodiment of the invention the hot junctions are embedded in a thermally conductive cement contacting the cooling element.

It is a feature of the invention that the positive and effective direct heat exchange provided between the air conditioner cooling element and the hot junctions of the thermocouple means achieves below freezing temperatures in the region of the cold thermocouple junctions without impairing the air cooling capacity of the air conditioner.

The manner in which the foregoing and other objects and advantages may best be achieved will best be understood from a consideration of the following description taken in light of the accompanying drawing, in which.

Figures 1, 2, 3, 4:
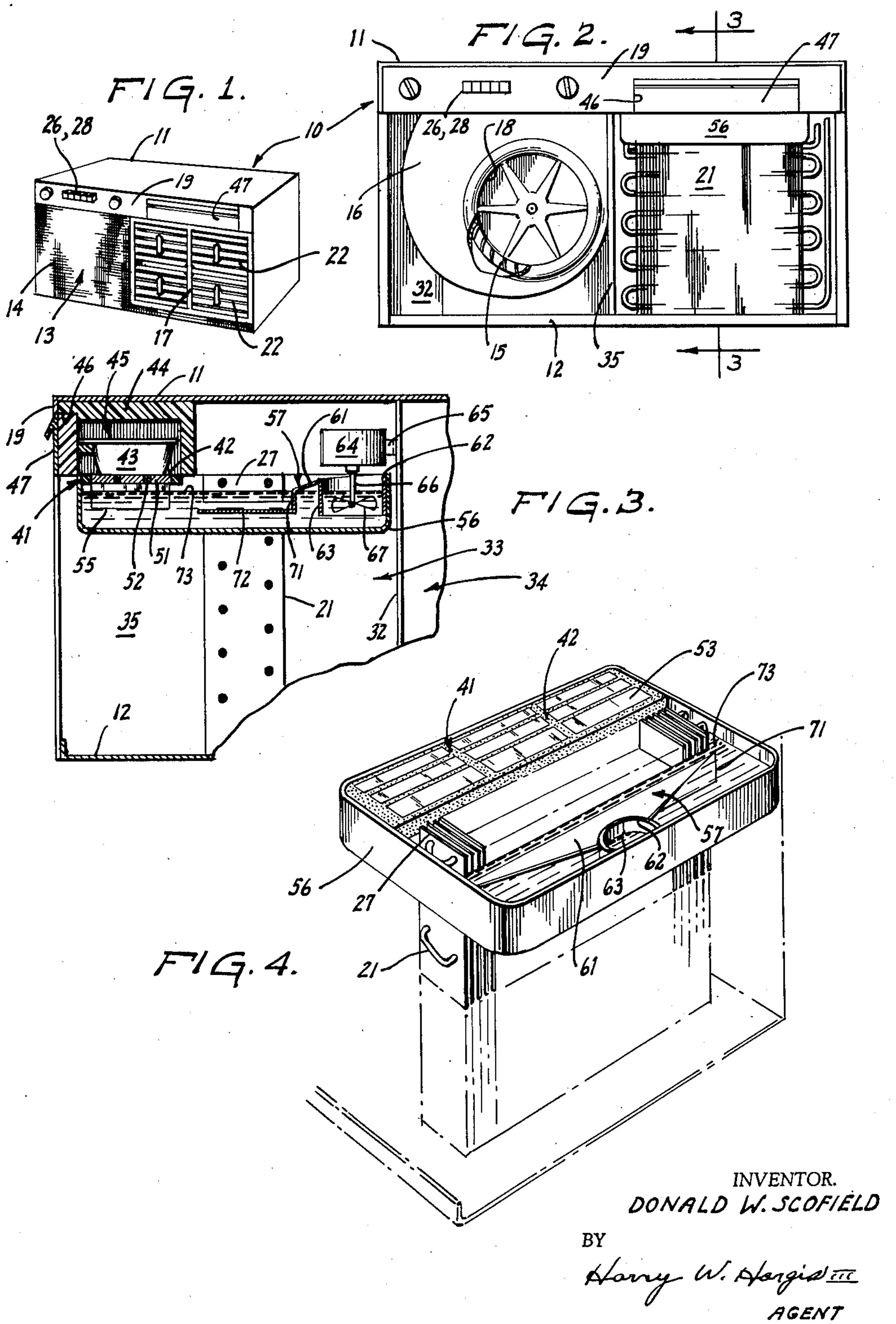
FIGURE 1 is a perspective showing of air conditioning apparatus embodying the invention.
FIGURE 2 is an enlarged elevational showing, with parts removed or broken away, of apparatus seen in FIGURE 1 and illustrating one embodiment of the invention.
FIGURE 3 is an enlarged fragmentary sectional view, in elevation, and looking in the direction of arrows 3—3 as applied to FIGURE 1.
FIGURE 4 is a perspective showing of the heat exchange elements seen in FIGURES 2 and 3 with parts both removed and broken away.

Referring with more particularity to the drawing, and first to FIGURES 1 to 4, the illustrated air conditioner 10 of the window mounted or room cooler type includes a cabinet or housing 11, preferably but not necessarily rectangular in configuration, having a base portion 12 and a conventional decorative panel 13, the latter disposed below a solid front wall portion 19 of the cabinet and comprising inlet and outlet air passages for the room air moving apparatus to be hereinafter more fully described. The inlet includes grille portion 14 disposed in air flow communication with inlet opening 18 provided in scroll structure 16 of the indoor blower portion 15 of the air moving apparatus. The aforesaid outlet air passage includes the grille portion 17 overlying an evaporator coil 21. A plurality of independently rotatable louvers 22 are disposed within grille portion 17 and are adapted to provide selectivity of the direction of discharge of air. Evaporator coil 21 is preferably of the finned type and is part of the conventional refrigeration system, disposed within housing 11, and of the type shown diagrammatically in FIGURE 5, including a motor compressor 23, condenser coil 24, restrictor 25, and associated conduits through which the motor compressor, condenser coil, restrictor, and evaporator coil are connected in series flow circuit. Compressor 23 is selectively energized through line L having in series therewith control switch means 26. Evaporator coil 21 includes an auxiliary coil portion 27 disposed in the upper portion of cabinet 11 and within an upwardly presented, open pan-like structure 56, the function of which structure will be hereinafter more fully explained.

Referring further to the air moving means, a motor 31 is connected to the line L and rotatably supports blower or fan means 15 adapted to cause circulation of air in heat exchange relation with the evaporator coil 21. Scroll structure 16 is disposed adjacent a partition 32 which divides cabinet 11 into an evaporator coil chamber 33 and a condenser coil chamber 34. The mouth portion of scroll structure 16 extends through another partition 35 to direct air against one face of evaporator coil 21 for flow therethrough and outwardly through rotatably mounted louvers 22. Condenser coil chamber 34 also has disposed therein motor compressor 23 and fan motor 31. A propeller type fan 36 is rotatably supported within chamber 34 by motor 31 to provide for drawing outdoor air into the chamber, over condenser coil 24, and discharging this air outwardly from chamber 34 over motor compressor 23. Arrangement of these parts within the chamber 34 will be understood without illustration, since it is in accordance with known practice.

In particular accordance with the invention, the abovementioned thermoelectric auxiliary refrigerating system or means 41 may take the form of a panel disposed in the upper portion of evaporator coil chamber 33. Thermoelectric panel means 41 has an upwardly presented surface portion 42 disposed and adapted to support a receptacle, for example an ice tray 43. Surface portion 42 of the thermoelectric panel means is disposed co-operatively with box-like, thermally insulative wall means 44 (FIGURE 3) to form a compartment 45 that is accessible, for insertion and removal of ice tray 43, through an opening 46 within which door means 47 is disposed. Conveniently, door means 47 is slidably mounted within opening 46, and tray 43 is attached to the door, whereby the tray may be removed merely by removing the door.

Thermoelectric panel means 41 comprises thermocouples made up of thermoelectric elements 51 each electrically and thermally insulated from the other by suitable means 52 within which elements 51 are embedded. Elements 51 are electrically interconnected by suitable electrically conductive straps 53 and 54 (FIGURE 5) partially embedded in insulation means 52, straps 53 having surface portions which cooperate with means 52 to form surface portion 42.

Thermoelectric elements 51 may be of any suitable known type, for example they may comprise semiconductive materials having dissimilar thermoelectric properties, and arranged as adjacent block-like elements. It is to be understood that any desired number of such rows may be disposed side-by-side in the plane of panel means 41. Each block-like element 51 further is designated by either the letter P or the letter N to indicate its thermoelectric property. The terms P and N are well known in the semiconductor art, the term P designating a material having an abundance of "holes" and the term N designating a material having an abundance of electrons. Semiconductive components including tellurium and bismuth have been found suitable for use as the respective P and N type materials.

Copper has been found suitable for use as straps 53 and 54, the lower conductive straps 54 being provided with heat exchange fins 55 (FIGURES 3 and 5) that extend downwardly into a pan-like container 56 within which auxiliary evaporator coil portion 27 is disposed.

To the side of evaporator coil structure 27 opposite the thermoelectric panel 41, and within pan-like container 56, is baffle-means 57 comprising a downwardly sloping portion 61 having sides that converge in the region of an opening 62 formed therein. Opening 62 is circular in configuration and a hollow cylinder 63 extends downwardly therefrom to within a short distance of the bottom of the pan-like container 56. A motor 64 is supported from partition 32 by a bracket 65 above cylinder 63. The motor shaft 66 extends downwardly into cylinder 63 and rotatably supports at its lower end a propeller-like liquid impeller 67. Baffle means 57 includes, additionally, a vertically extending portion 71 disposed adjacent the evaporator coil portion 27 and a generally horizontal portion 72 spaced from the bottom of pan-like container 56 and extending beneath evaporator coil portion 27. A heat exchange fluid 73, noncongealable at temperatures encountered in practice, is held within the container 56 and partially immerses fins 55 of the thermocouple straps 54 as well as evaporator coil portion 27, in fluid 73. Mixtures of alcohol and water have been found suitable for use as the liquid 73, but it is to be understood that other known thermally conductive, electrically non-conductive fluids may be used for this purpose.

Impeller 67 is completely immersed, and the cylindrical portion 63 of baffle means 57 is partially immersed. The construction and arrangement of the above described elements is such that by driving rotatable impeller 67 heat exchange liquid 73 is lifted upwardly through cylinder 63 and onto the upper portion of the sloping baffle portion 61, whereupon the liquid drains downwardly and over the evaporator coil portion 27, to be cooled thereby, and through thermocouple fins 55 to cool the same. Liquid 73 then returns to the region of the impeller 67 by flowing beneath horizontally extending baffle portion 72 disposed beneath evaporator coil portion 27. Impeller motor 64 is energized through line L, along with motor compressor 23, by closing switches 26 and 28.

Suitable power supply means 74 for thermoelectric panel means 41 is connected to line L, through switches 26 and 28 and is adapted to supply the required direct current for each of the thermocouple junctions through the terminal means 75 and 76 provided in panel means 41. Current flows as shown by the arrow at terminal means 76 (FIGURE 5), the construction and arrangement of the panel means being such that the straps 53 disposed in its upper surface comprise the cold junctions of panel means 41 and the lower straps 54, having fins 55 extending into heat exchange liquid 73, comprise the hot junctions of the thermoelectric panel means.

In the operation of the apparatus hereinabove described, closing of switch 26 energizes compressor 23 and fan motor 31 whereby the refrigerator and the air moving systems function to cool an enclosure to be treated. Also, with the closing of switch 28, while switch 26 is closed, impeller motor 64 is energized and the thermocouple heat exchange fluid is circulated to absorb heat from the hot junctions and give up said heat to the evaporator. Closing of switch 28 also causes thermoelectric panel means 41 to be energized, whereby upper straps 53 become cold and the lower straps 54 become warm. Heat generated at the hot junctions 54 flows into fins 55 and is dissipated therefrom into the relatively cool stream of heat exchange liquid 73 being circulated over the evaporator coil portion 27. By this heat exchange coupling, the efficiency of thermoelectric panel 41, in performance of its ice freezing function is greatly enhanced without unduly increasing the thermal loading upon the evaporator 21 and motor compressor 23.

Figure 6:
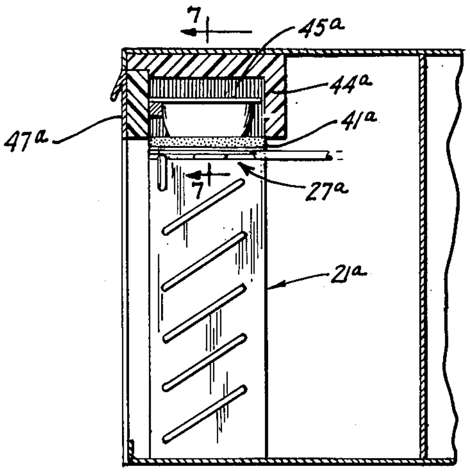
FIGURE 6 is a fragmentary sectional view similar to FIGURE 3 and showing a modified embodiment of the invention.
Figure 7:
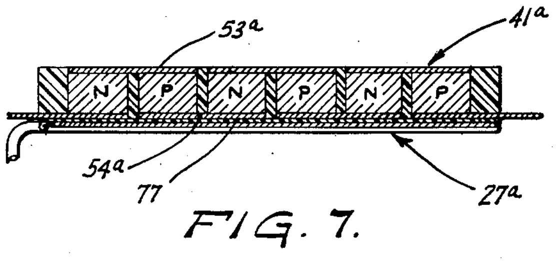
FIGURE 7 is a fragmentary sectional view, in elevation, looking generally in the direction of lines 7—7 as applied to FIGURE 6.
Figure 5:
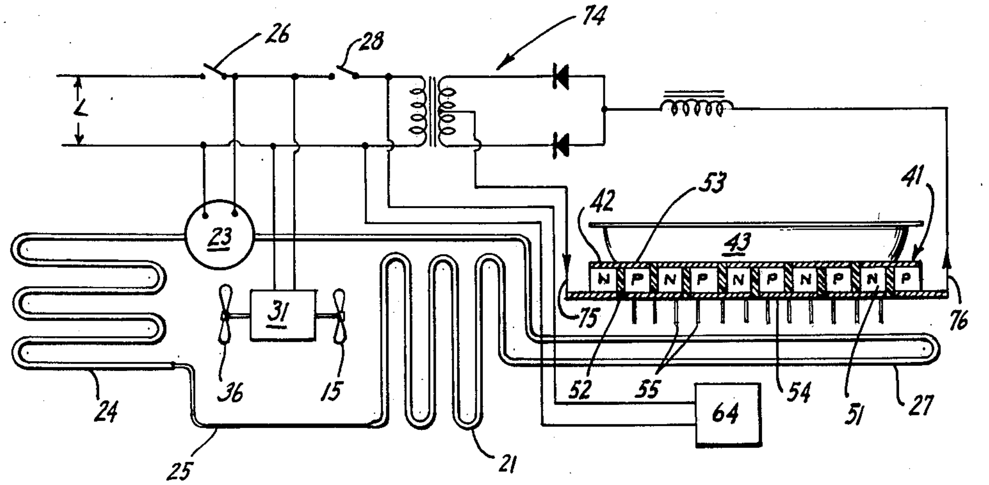
FIGURE 5 is a somewhat diagrammatic showing of a heat exchange system incorporating the principles of the present invention and as illustrated in FIGURES 1 to 4.

In the modified embodiment of the invention shown in FIGURES 6 and 7, a flat, plate-like portion 27*a* of an evaporator 21*a* is disposed in direct heat exchange relation with thermally conductive, electrically insulative cement 77 within which straps 54*a* are embedded, said straps comprising the hot junctions of a thermocouple panel 41*a* of the type hereinabove described, but which junctions are not provided with heat exchange fins. A number of such cements are well known in the art as "thermal mastics" and will not be described in detail. Straps 53*a* comprise the cold junctions of panel 41*a* and are disposed in heat exchange relation with compartment means 45*a* defined by insulative walls 44*a*, door 47*a* and thermoelectric panel 41*a*. Panel 41*a* is supplied with current through terminals 75*a* and 76*a*, from a source of the type shown at 74 in FIGURE 5. Evaporator 21*a* and portion 27*a* are supplied with refrigerant at low pressure by suitable condensing unit means also as shown in FIGURE 5. Evaporator portion 27*a* is preferably of the type comprising a unitary sheet having refrigerant passageways formed therein.

It will be appreciated from the foregoing that the positive and effective heat exchange provided between the air conditioner evaporator and the hot junctions of the thermo-couple means achieves below-freezing temperatures in the region of the cold thermocouple junctions without unduly impairing the air cooling capacity of the air conditioner.

While a pair of embodiments of the invention has been shown, it will be understood that the invention is susceptible of other modifications within the scope of the appended claims.

I claim:

1. In an air conditioning machine: a first refrigerating system of the liquid vapor type, and comprising evaporator means including a first portion for performing an air conditioning function and a second portion; an auxiliary refrigerating system of the thermoelectric type including cold junctions for performing an auxiliary refrigerating function, and hot junctions; and thermally conductive material within which said hot junctions are embedded, said thermally conductive material being disposed in high heat exchange relation with said second portion of said evaporator means.

2. An air conditioning machine according to claim 1, and further characterized in that said cold junctions are disposed and adapted to support a receptacle to freeze ice therein.

3. An air conditioning machine according to claim 1, and further characterized in that said thermally conductive, electrically non-conductive material is of cementlike nature and mounts said hot junctions to said second evaporator means portion.

4. In an air conditioning machine: a first refrigerating system of the liquid-vapor type, and including evaporator means for performing an air conditioning function; an auxiliary refrigerating system of the thermoelectric type including cold junctions for performing an auxiliary refrigerating function, and hot junctions; thermally conductive electrically non-conductive liquid in which said hot junctions are embedded, said liquid being disposed in high heat exchange relation with said evaporator means; and means accommodating flow of said liquid over said hot thermocouple junctions and said evaporator means.

5. A combination air conditioner and refrigerator, comprising: evaporator means including a first air cooling surface portion and a second cooling portion; means for moving air to be cooled over said first cooling surface portion of said evaporator means; thermocouple means comprising hot junctions and cold junctions; and thermally conductive electrically non-conductive material within which said hot junctions are embedded, said material being disposed in high heat exchange relation with said second cooling portion of said evaporator means.

6. A combination in accordance with claim 5, and characterized in that said hot and cold thermocouple junctions are disposed in panel-like configuration, and said cold junctions are disposed and adapted to support receptacle means for water to be frozen.

7. The combination of claim 6, and characterized in that said material within which said hot thermocouple junctions are embedded is cement mounting said panel means to said second evaporator portion.

8. A combination in accordance with claim 6, and characterized in that the material within which said hot junctions are embedded comprises a heat exchange liquid, and further including means accommodating flow of said heat exchange liquid over the recited hot thermocouple junctions and said second portion of said evaporator means.

9. An air conditioner having auxiliary refrigerating means, comprising: refrigerant evaporator means including first and second cooling surface portions; means for moving air to be cooled over said first cooling surface portion; thermocouple means comprising cold junctions disposed and adapted to perform an auxiliary cooling function and hot junctions adapted to dissipate the heat absorbed at the cold junctions; means defining a container having heat exchange liquid therein disposed in high heat exchange relation with said hot thermocouple junctions; and means for effecting flow of said heat exchange liquid over said hot thermocouple junctions and in heat exchange relation with said second cooling surface portion of said evaporator means.

10. A combination in accordance with claim 9 and further characterized in that said means for effecting flow of heat exchange liquid comprises: conduit means having upper and lower end portions, the latter portion being disposed within said liquid; baffle means sloping downwardly from the upper end portion of said conduit means and having a lower edge portion disposed adjacent said second evaporator surface portion; and liquid-impeller means disposed and adapted to lift said heat exchange liquid within said conduit means and to cause it to flow onto said baffle means and downwardly onto said second cooling surface portion of said evaporator means.

11. The combination according to claim 10 and further characterized in that said conduit means is a hollow, generally vertically extending cylinder, and said baffle means is generally fan shaped, being divergent from said cylinder, and has a planar portion adjacent said lower edge depending into said liquid and extending beneath said second cooling surface portion of said evaporator means.

12. In an air conditioner of the room cooler type having refrigerant evaporator means, insulated wall means defining a refrigerated storage compartment, thermocouple means disposed in one of said wall means and having cold junctions thermally associated with said compartment to cool the same and hot junctions disposed to the outside of said compartment, and thermally conductive material disposed in high heat exchange relation with said evaporator means and within which said hot junctions are embedded.

13. An air conditioner according to claim 12, and further characterized in that said thermally conductive material comprises a thermally conductive cement disposed in interconnecting engagement with said hot junctions and said refrigerant evaporator means.

14. An air conditioner according to claim 12, and characterized in that said thermally conductive material comprises a liquid caused to flow sequentially over said evaporator means and said hot junctions.

15. An air conditioner according to claim 14, and further characterized in that liquid impeller means is provided to cause such flow of liquid over said evaporator means and said hot junctions.

16. In an air conditioning machine: a first refrigerating system of the liquid-vapor type, and including evaporator means having a first portion for performing an air conditioning function and a second portion; a refrigerating system of the thermoelectric type and including cold junctions for performing an auxiliary refrigerating function, and hot junctions for rejecting heat absorbed at the cold junctions, and a thermally conductive electrically non-conductive material within which said hot junctions are embedded, said material being arranged to be cooled by said second portion of said evaporator means.

17. An air conditioning machine according to claim 16, and further characterized in that said cold junctions are disposed and adapted to support a receptacle to freeze ice therein.

References Cited in the file of this patent

UNITED STATES PATENTS

| | | |
|---|---|---|
| 2,947,150 | Roeder | Aug. 2, 1960 |
| 2,964,912 | Roeder | Dec. 20, 1960 |
| 2,966,033 | Hughel | Dec. 27, 1960 |